United States Patent [19]
Hurite et al.

[11] Patent Number: 5,641,917
[45] Date of Patent: Jun. 24, 1997

[54] MULTI-AXIS SEAT DURABILITY TEST MACHINE

[75] Inventors: John M. Hurite, West Bloomfield; Thomas J. Kralik, Warren; Makoto Watanabe, Farmington Hills, all of Mich.

[73] Assignee: Tachi-S Engineering, U.S.A., Inc., Farmington Hills, Mich.

[21] Appl. No.: 566,217

[22] Filed: Dec. 1, 1995

[51] Int. Cl.⁶ ............................................. G01D 7/02
[52] U.S. Cl. .............................. 73/865.3; 73/865.6
[58] Field of Search ............... 73/794, 796, 865.3, 73/865.6, 865.8

[56] References Cited

U.S. PATENT DOCUMENTS

| | | |
|---|---|---|
| 2,154,561 | 4/1939 | Breer et al. |
| 2,359,318 | 10/1944 | Lay et al. |
| 3,147,617 | 9/1964 | Kaptur, Jr. et al. |
| 3,334,517 | 8/1967 | Janapol |
| 3,413,849 | 12/1968 | Janapol |
| 3,592,041 | 7/1971 | Spencer |
| 4,092,009 | 5/1978 | Koutsky ............................. 248/421 |
| 4,183,493 | 1/1980 | Koutsky ............................. 248/430 |
| 5,112,018 | 5/1992 | Wahls ................................ 248/394 |
| 5,373,749 | 12/1994 | Strand et al. |
| 5,456,019 | 10/1995 | Dowell et al. ....................... 33/600 |
| 5,536,059 | 7/1996 | Amirouche ......................... 248/566 |

*Primary Examiner*—Richard Chilcot
*Assistant Examiner*—Max H. Noori
*Attorney, Agent, or Firm*—Dykema Gossett PLLC

[57] ABSTRACT

A multi-axis seat test machine for use with seats is disclosed. The test machine includes a loading element and a seat mount. A selectively actuable fore-aft displacement mechanism is disposed between the loading element and the seat mount and operably displaces one of the seat mount and the loading element relative to the other in the fore-aft direction. A selectively actuable lateral displacement mechanism is disposed between the loading frame and the seat mount and operably displaces one of the seat mount and the loading frame relative to the other in a lateral direction. An engaging member simulates, at least in part, a shape of a human posterior for engagement with the seat. The loading element operably biases the engaging member against the seat in a substantially vertical direction with a predetermined vertical load.

10 Claims, 9 Drawing Sheets

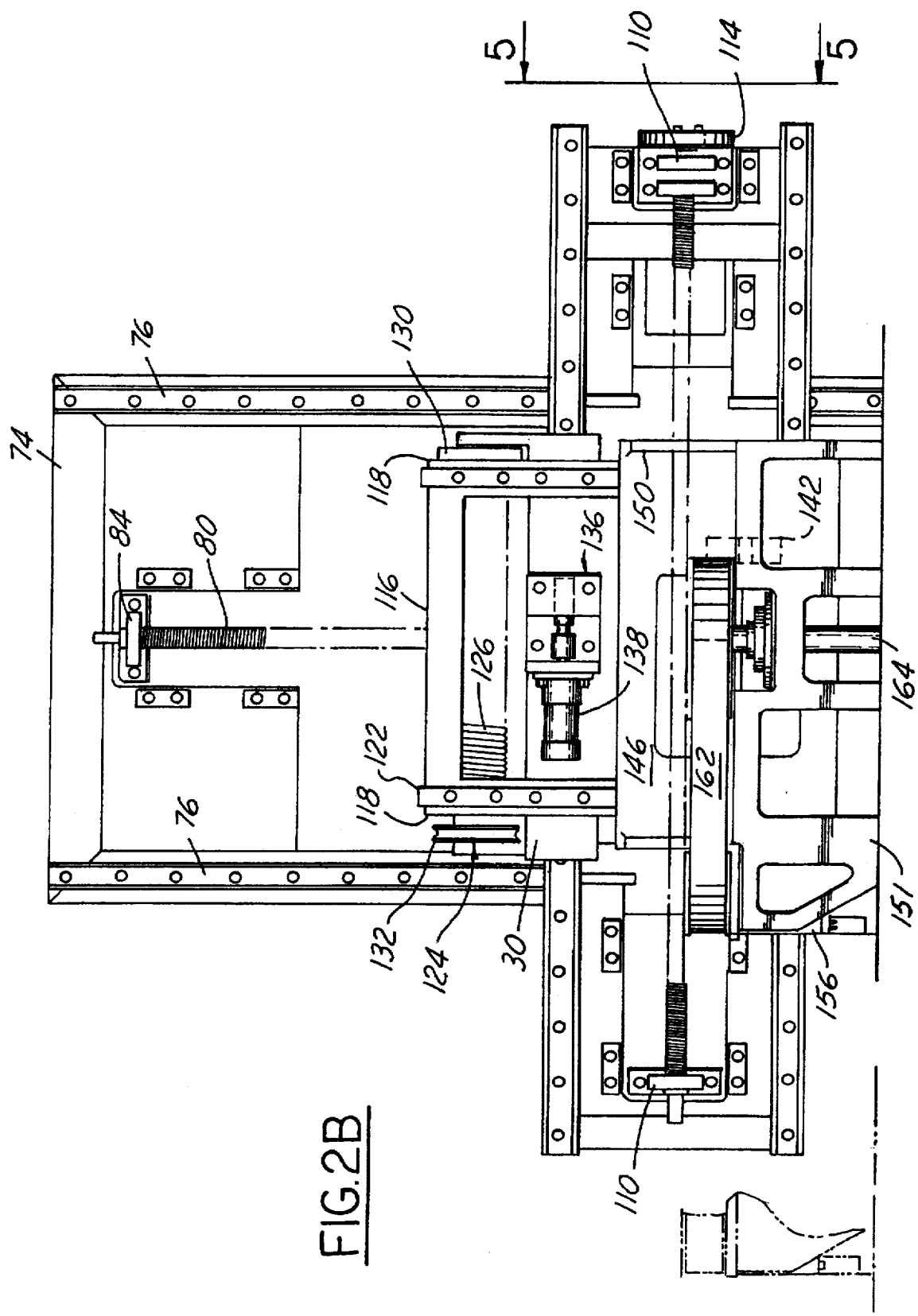

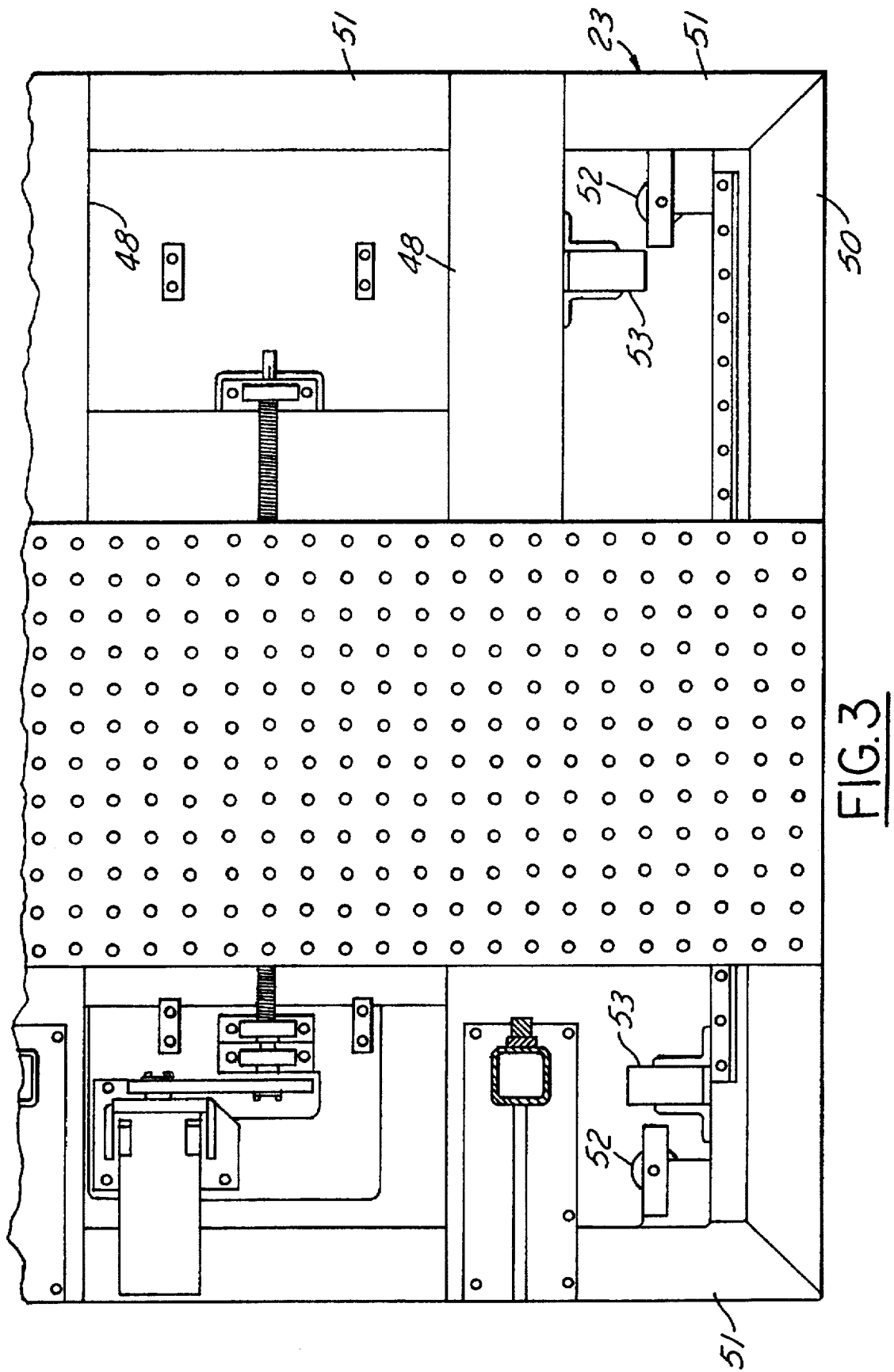

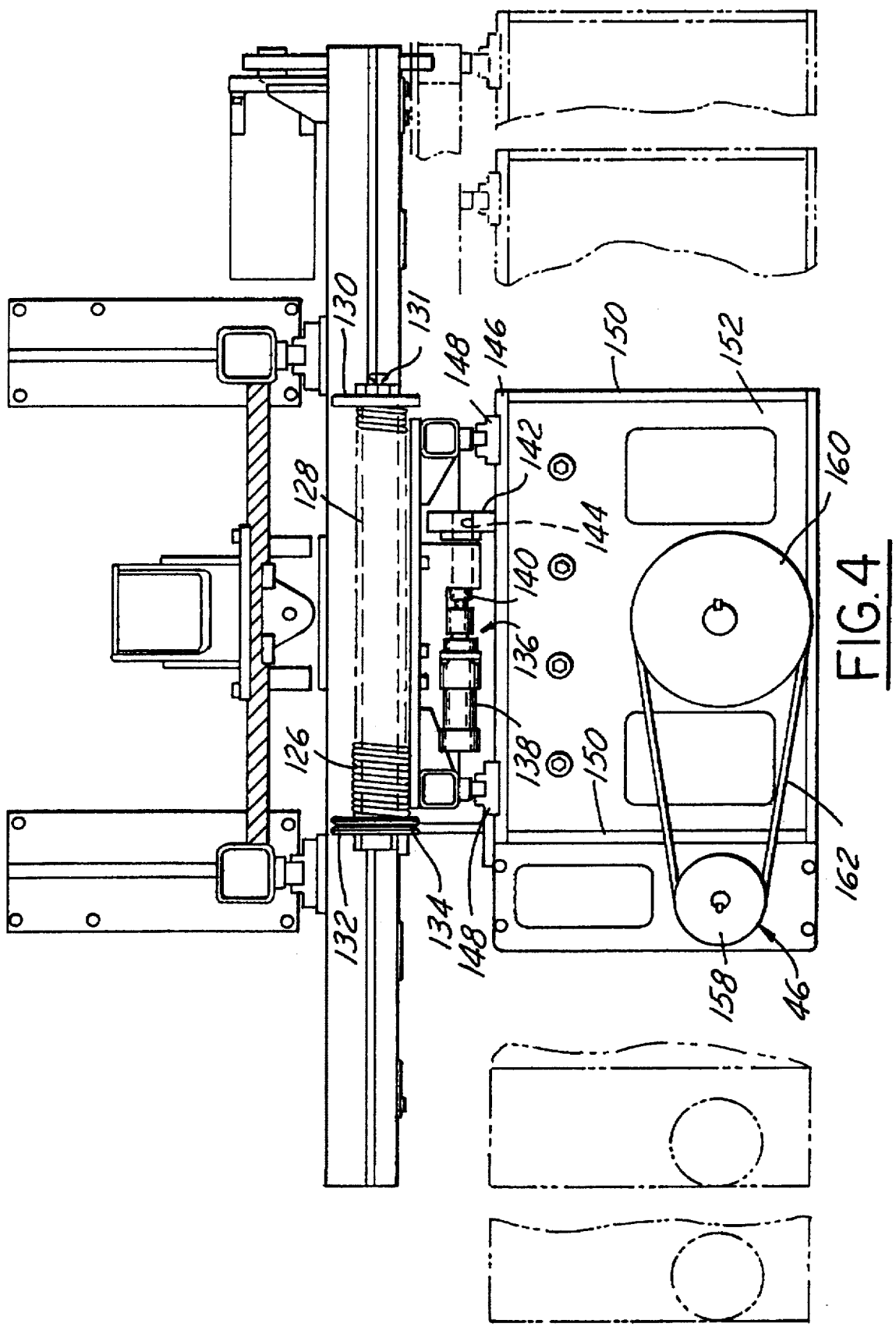

MULTI-AXIS SEAT DURABILITY TEST MACHINE

FIELD OF THE INVENTION

The present invention relates to the field of seat testing, and more particularly to the testing of seats to be used in motor vehicles.

BACKGROUND OF THE INVENTION

Known seat test machines typically load the seats being tested in one or two directions. While this may be adequate for the testing of conventional furniture, it is inadequate for the testing of motor vehicle seats which, in use, are subjected to loading conditions which vary significantly with each vehicle. For example, a person enters and exits a heavy duty truck cab in a different manner than they enter and exit a sports car, resultantly imposing different loads on the respective seats during entry and exit. Therefore, to provide a lab test which simulates wear of the seat which would occur in the vehicle, a seat test machine must be able to apply loads against the seats in several directions, and be able to vary the loads and the directions of loading consistent with in-vehicle loading.

It is therefore desired to provide a multi-axis seat test machine which enables the duplication of a wide variety of loading conditions so as to provide a more accurate test for seat durability.

SUMMARY OF THE INVENTION

A multi-axis seat test machine for use with seats is disclosed. The test machine includes a loading element and a seat mount. A selectively actuable fore-aft displacement mechanism is disposed between the loading element and the seat mount and operably displaces one of the seat mount and the loading element relative to the other in the fore-aft direction. A selectively actuable lateral displacement mechanism is disposed between the loading frame and the seat mount and operably displaces one of the seat mount and the loading frame relative to the other in a lateral direction. An engaging member simulates, at least in part, a shape of a human posterior for engagement with the seat. The loading element operably biases the engaging member against the seat in a substantially vertical direction with a predetermined vertical load.

The multi-axis seat test machine enables the realistic simulation of the loading of a motor vehicle seat.

BRIEF DESCRIPTION OF THE DRAWINGS

FIG. 1-B is a side view of an upper portion of the multi-axis seat test machine of FIG. 1-A.

FIG. 2-B is rear view of an upper portion of the multi-axis seat test machine of FIG. 2-A.

FIG. 3 is a partial plan view of the multi-axis seat test machine with a vertical frame portion shown in section.

FIG. 4 is a plan view of the loading frame and a lateral carriage of the multi-axis seat test machine showing the lateral carriage in a plurality of positions.

DETAILED DESCRIPTION OF THE PREFERRED EMBODIMENT

Figure 1A:
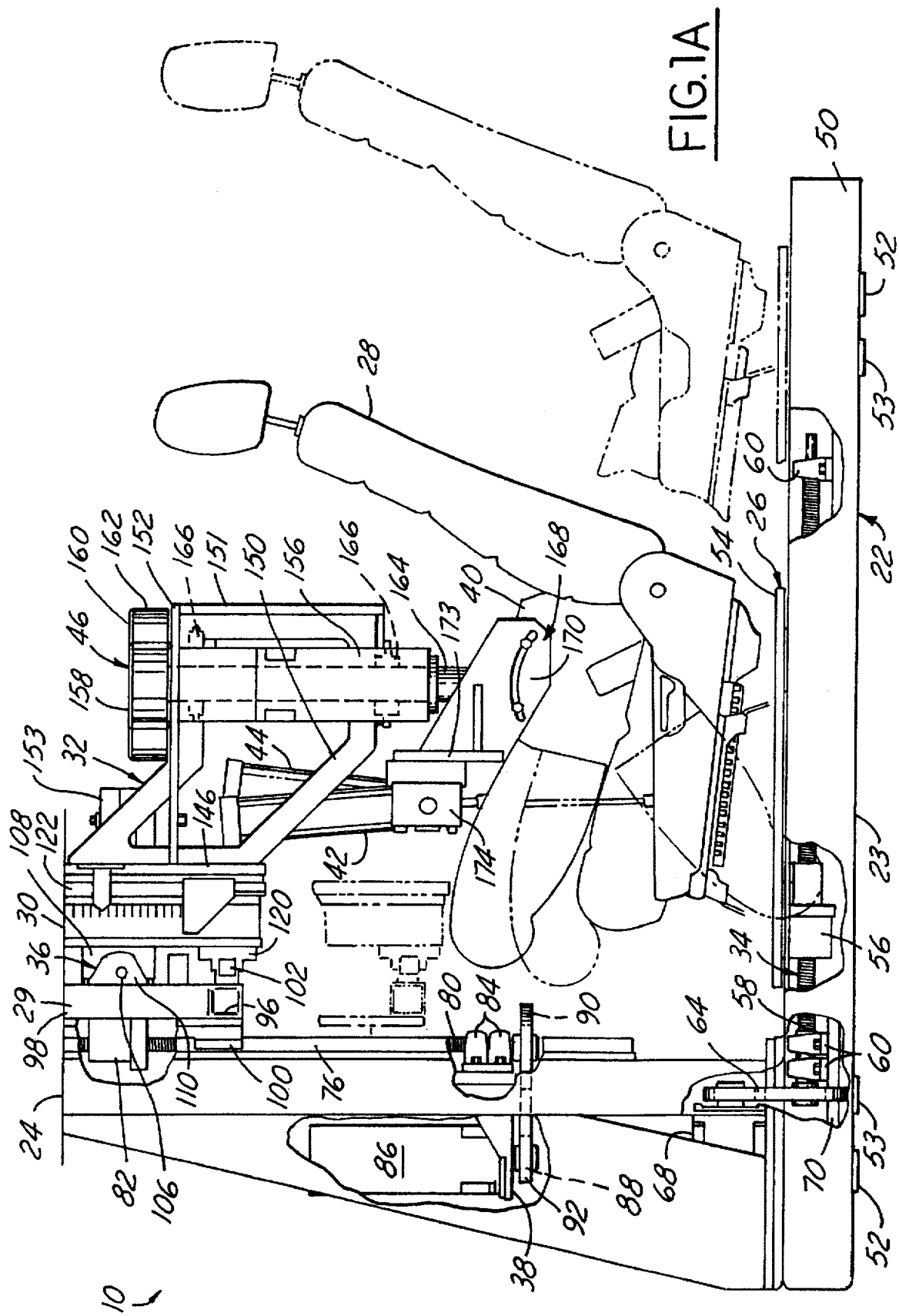
FIG. 1-A is a side view of a lower portion of the multi-axis seat test machine.
Figure 1B:
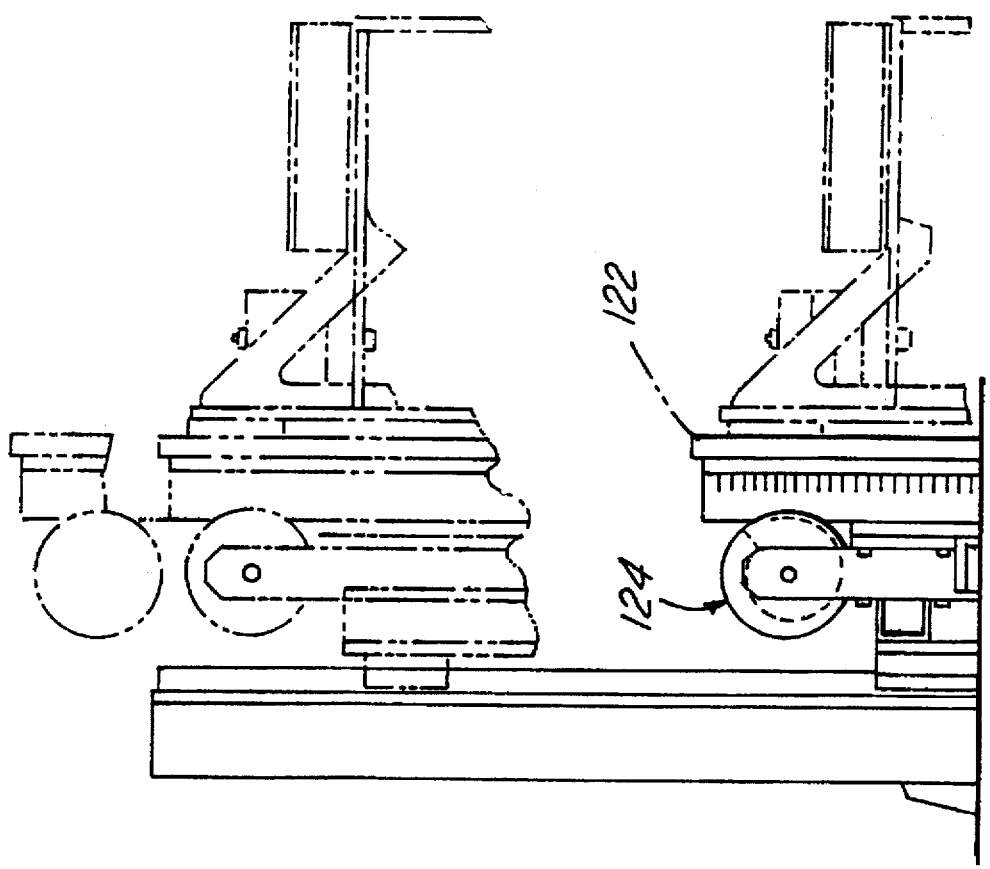
Figure 2A:
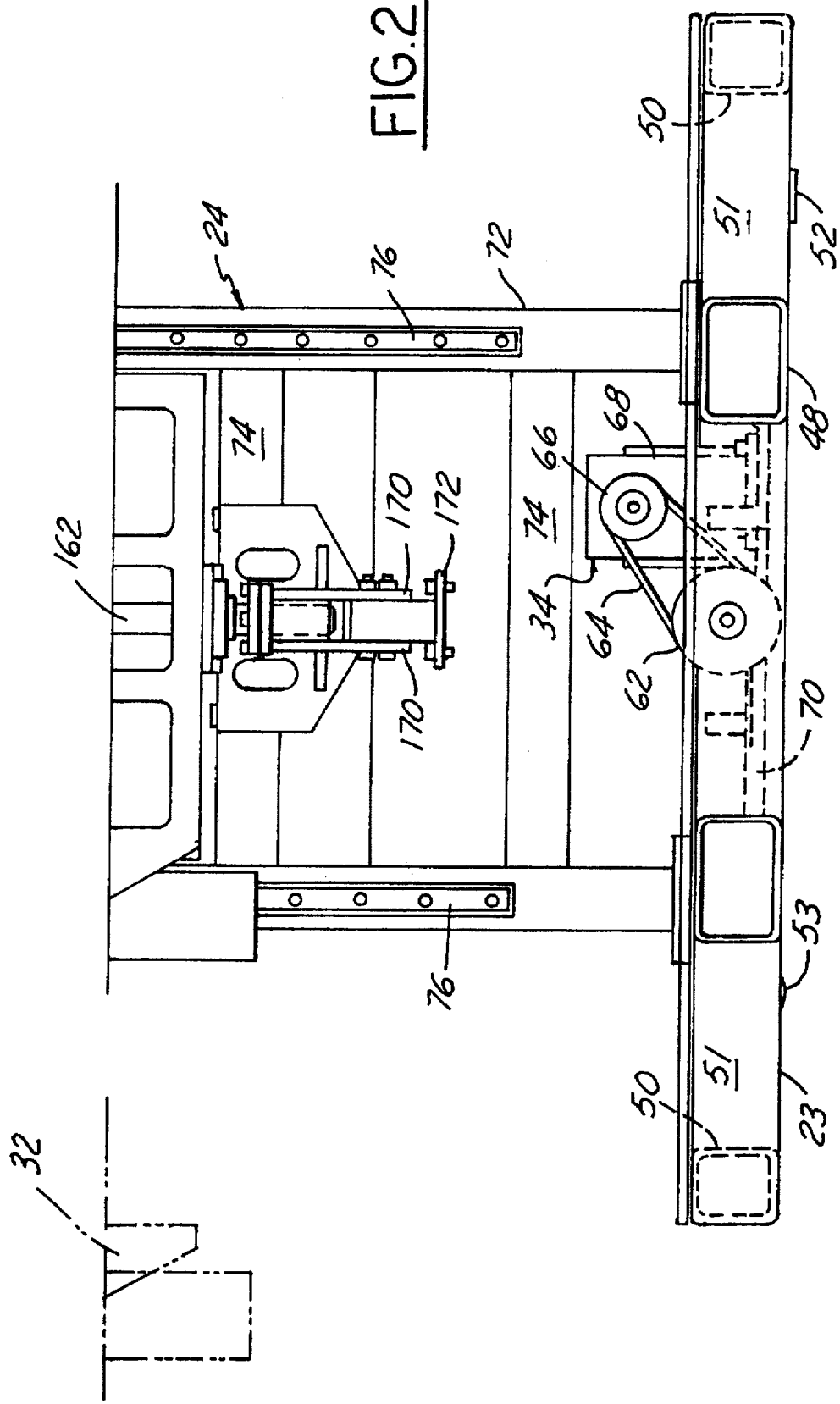
FIG. 2-A is a rear view of a lower portion of the multi-axis seat test machine.
Figure 6:
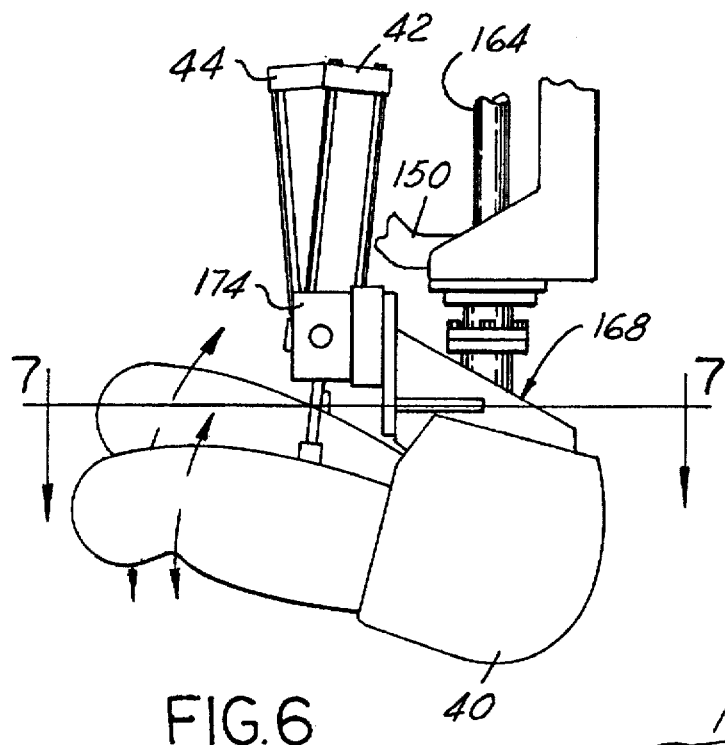
FIG. 6 is a side view of the engaging member and the loading shaft.
Figure 7:
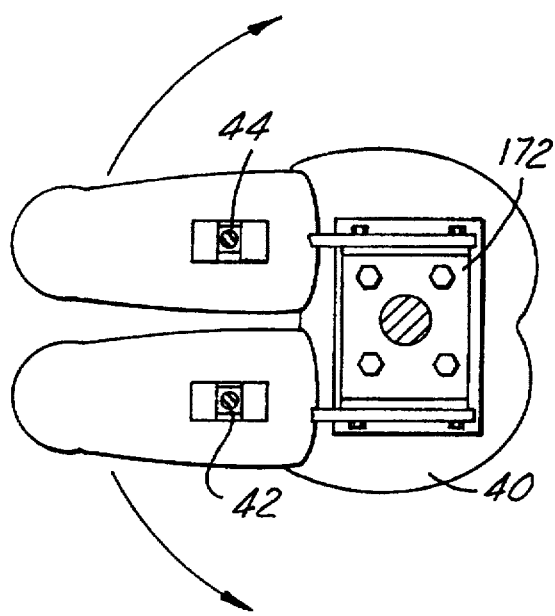
FIG. 7 is a plan view of the engaging member of FIG. 6 in the direction of arrows 7.
Figure 8:
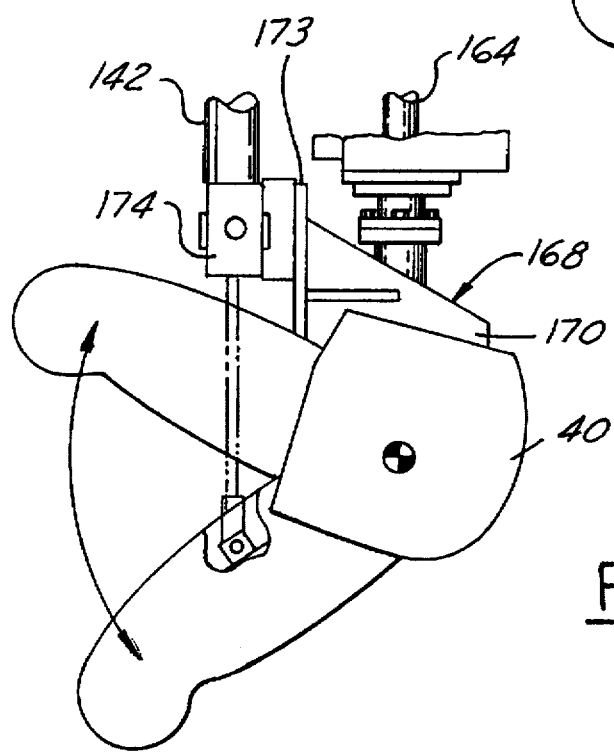
FIG. 8 is a side view of the engaging member of FIG. 6 showing the range of motion of the leg member.

A substantially planar seat test machine 20 is best seen in its entirety in FIGS. 1-A and 1-B. FIG. 1-B shows a top portion of machine 20 not shown in FIG. 1-A.

The backbone of the seat test machine 20 is a test fixture frame 22 which includes a horizontal fore-aft frame portion 23 and a vertical frame portion 24. A seat mount 26 is slidably disposed on fore-aft frame portion 23 for fore-aft movement. A seat 28 to be tested is rigidly mounted to seat mount 26.

A vertical carriage 29 translates in a vertical direction along vertical frame portion 24. A lateral carriage, alternatively called a loading frame 30 is slidably disposed on vertical carriage 29 for lateral movement thereacross.

A loading carriage, or loading element 32, is slidably mounted to lateral carriage 30 for vertical movement relative thereto. A fore-aft displacement mechanism 34 disposed between the horizontal fore-aft frame portion 23 and seat mount 26 provides relative fore-aft movement therebetween. Lateral displacement mechanism 36 disposed between vertical carriage 29 and lateral carriage 30 produces relative lateral motion therebetween. Vertical displacement mechanism 38 disposed between vertical frame portion 24 and vertical carriage 29 produces relative vertical displacement therebetween. An engaging member, such as a lower portion of a Hybrid II test dummy 40 including the hips and the upper legs or thighs, is mounted to loading carriage 32 to produce engagement with seat 28. A first pneumatic actuator 42 is connected to the left leg of dummy 40 and a second pneumatic actuator 44 is connected to the right leg of dummy 40.

A rotary twist actuator 46 mounted to loading carriage 32 operably rotates dummy 40.

As is apparent from FIGS. 1-A, 2-A and 3, horizontal fore-aft frame portion 23 includes a pair of parallel fore-aft oriented rectangular tubes 48 surrounded on the outside by parallel fore-aft square tubes 50. These four tubes 48, 50 are joined together by lateral sections of square tubing 51. Four feet 52 and four casters or wheels 53, one of each at the corners of frame portion 23, engage the ground. Feet 52 are selectively positioned in a vertical direction by threading or unthreading associated shafts into or out of a bracket to level the frame as desired. Feet 52 can be retracted enabling casters 53 to engage the ground exclusive of feet 52 so that seat test machine 20 can be rolled to a new position.

Seat mount 26 includes mounting plate 54 and a fore-aft driven ball unit 56 attached thereto and is engaged by lead screw 58. Lead screw 58 is supported on both ends by support bearings 60. A driven gear 62 is fixed to a forward end of lead screw 58. A toothed drive belt 64 connects driven gear 62 with drive gear 66 which is powered by a fore-aft electric drive motor 58. Drive motor 68 is an R-40 series (R-45) servo motor. Drive motor 68 and support bearings 60 are mounted to horizontal support plates 70 which in turn are fixed to fore-aft frame portion 23.

Vertical frame portion 24, best seen in FIGS. 1A, 1B, 2A and 2B, includes a pair of vertical angle plates 72 joined by lateral reinforcing tubes 74. Vertical angle plates 72 each have a vertical guide rail 76 fixed thereto. Vertical carriage 29 is slidably mounted on guide rails 76 for vertical movement. A vertical lead screw 80 engages a vertical driven ball unit 82 affixed to vertical carriage 29. Vertical lead screw 80 is supported at both ends by vertical support bearings 84.

A vertical drive motor 86 is connected with vertical lead screw 80 by a vertical drive gear 88 rotating with motor 86 and a vertical driven gear 90 rotating with lead screw 80, gears 88 and 90 being connected by a toothed vertical drive belt 92. Vertical drive motor 86 is an R-40 series (R-46) servo motor.

Figure 5:
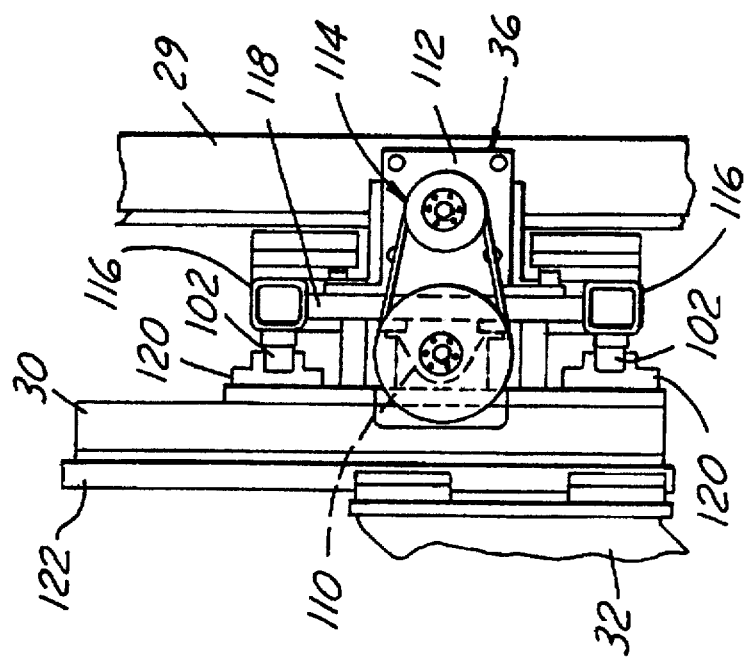
FIG. 5 is a partial end view of the lateral carriage in the direction of arrows 5 of FIG. 2-B.

Vertical carriage 29, best seen in FIGS. 2B and 5, includes lateral frame members 96 and vertical frame connecting members 98. Vertical guide members 100 connected to vertical carriage 29 slidably engage vertical guide rails 76, thereby facilitating vertical movement. Lateral guide rails 102 are located along horizontal frame members 96 on the side of carriage 29 opposite and perpendicular the orientation of vertical guide members 100. Lateral carriage 30 is slidably mounted on lateral guide rails 102. A lateral lead screw 106 is engaged with a lateral driven ball unit 108 fixed to lateral carriage 104. Lateral lead screw 106 is supported by lateral support bearings 110 fixed to vertical carriage 29. Lateral drive motor 112 is connected with lateral lead screw 106 by a lateral drive transmission 114 disposed there between. Transmission 114 includes a drive gear, a driven gear, and a toothed drive belt disposed therebetween. Lateral drive motor 112 is an R-40 series (R-45 servo motor).

Lateral carriage 30 includes horizontal tube members 116 and vertical tube members 118. Lateral guide members 120 fixed to lateral carriage 30 slidably engage rails 102. Vertical loading rails 122 are disposed on lateral carriage 30 normal to the orientation of lateral guiding members 120 and on an opposite side of lateral carriage 30.

An unloading mechanism 124 is mounted to lateral carriage 30. A linear spring rate torsion spring 126 of unloading mechanism 124 is disposed over a supporting sleeve 128. A right end of spring 126 is fixed to lock-wheel 130 at a right hand end of spring 126 as shown in FIGS. 2-B and 4. A cam pulley 132 is fixed to the left hand end of spring 126, and is able to rotate relative to test fixture frame 22. A cable 134 is fixed to, and wraps around, cam pulled 132. A free end of cable 134 engages loading carriage 32. The cam profile of cam pulley 132 is configured as a function of the spring rate of torsion spring 126 to provide a constant upward load on loading carriage 32 over approximately a 10 inch range of relative vertical displacement between loading carriage 32 and lateral carriage 30.

A locking mechanism 136, best seen in FIGS. 2-B and 4, is disposed between lateral carriage 30 and loading carriage 32. Locking mechanism 136 includes a pneumatic actuator 138 and a slidable locking pin 140. Locking pin 140 is fixed relative to a push rod of the actuator for axial movement therewith. An engaging plate 142 is fixed to loading carriage 32 and has a receiving aperture 144 engaged by pin 140 when loading carriage 32 is in a maximum vertical height position relative to lateral carriage 30 and pin 140 is fully extended. Pneumatic actuator 138 can be selectively actuated to disengage pin 140 from plate 142 to provide a vertical drop loading of a test seat.

Pin 140 is not aligned with aperture 144 in FIG. 2-B because loading carriage 32 is shown in a bottom, or released, position with the aperture 144 and pin 140 resultantly offset by the 10 inches of available loading carriage 32 to lateral carriage 30 travel.

Loading carriage 32 includes a mounting plate 146 to which are fixed loading carriage guide members 148 slidably engaging vertical loading rails 122. A pair of side plates 150 extend from mounting plate 146 and have a rear plate 151 disposed therebetween joining them. A horizontal top plate 152 also joins side plates 150. Ballast plates 153 can be stacked on top plate 152 to provide additional vertical force. Ballast plates 153 are held in place by at least one threaded rod passing therethrough.

Twist actuator 46 is carried by loading carriage 32. Twist actuator 46 includes a servo motor 156 with a drive pulley 158 connected to a driven pulley 160 by a drive belt 162. A loading shaft 164 is fixed to driven pulley 160 and rotates responsive to rotation of motor 156. Support bearings 166 for loading shaft 164 are located in locating carriage 32.

An engagement bracket 168, best seen in FIGS. 2-A, 6, 7 and 8, for disposition between engaging member 40 and loading shaft 164 includes a pair of clamping plates 170 and a pivot member 172 which makes it possible to position engaging member 40 at a predetermined angle of engagement relative to the seat. A pair of bolts, passing through plates 170 and pivot member 172 hold them in a fixed relative position. A front end plate 173 connects plates 170. An actuator support 174 is fixed to clamping plates 170. Cylinders of first and second pneumatic actuators 42 and 44 are pivotably supported by actuator supports 174 and their piston rods engage left and right legs respectively of dummy 40. The engagement bracket 168 in the configuration shown enables the hip or pelvic portion of dummy to be fixed at a predetermined angle, and the legs to be moved through a wide range of motion.

Figure 9:
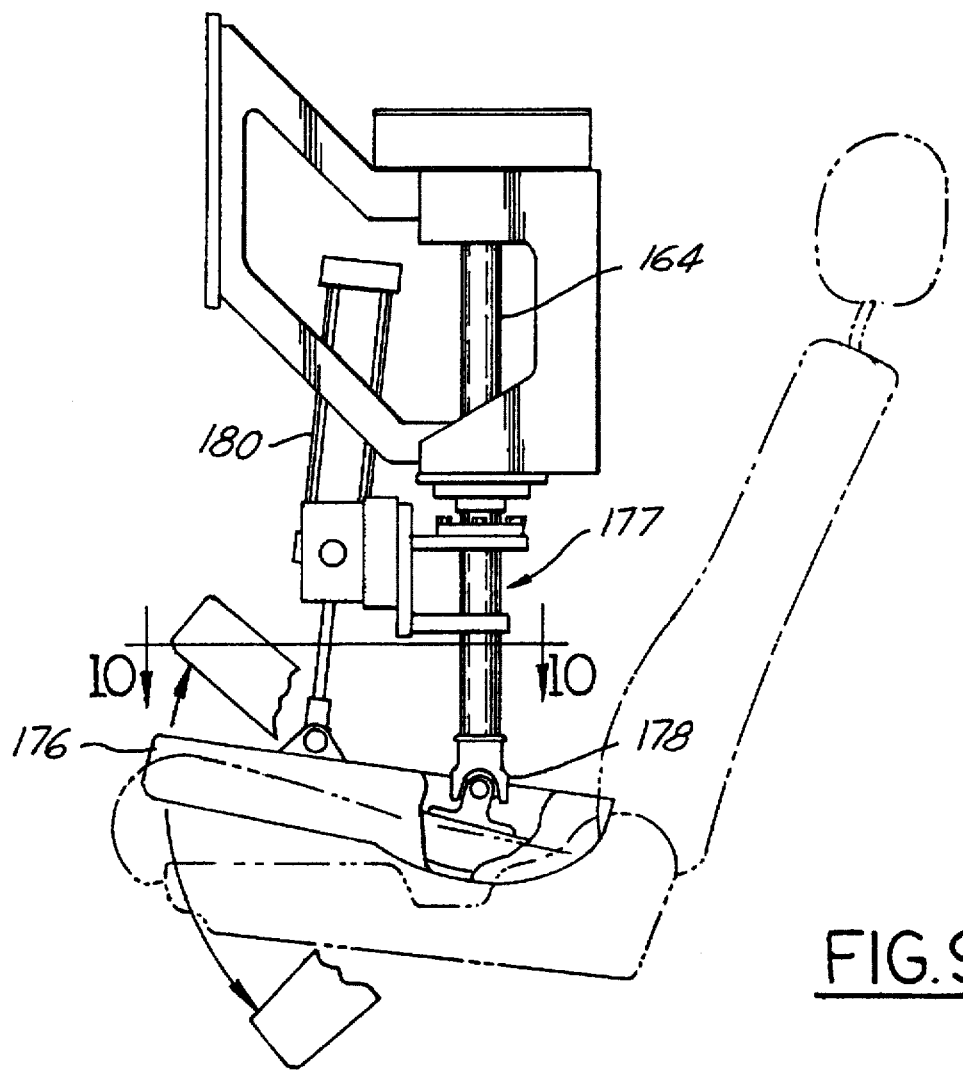
FIG. 9 is a side view of an alternative engaging member and the loading carriage.
Figure 10:
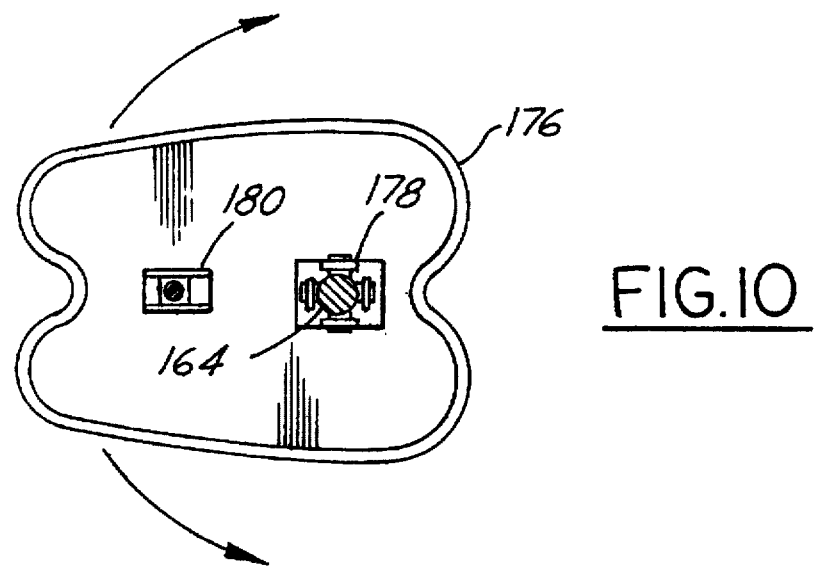
FIG. 10 is a view of the alternative engaging member of FIG. 9 in the direction of arrows 10 of FIG. 9.
Figure 11:
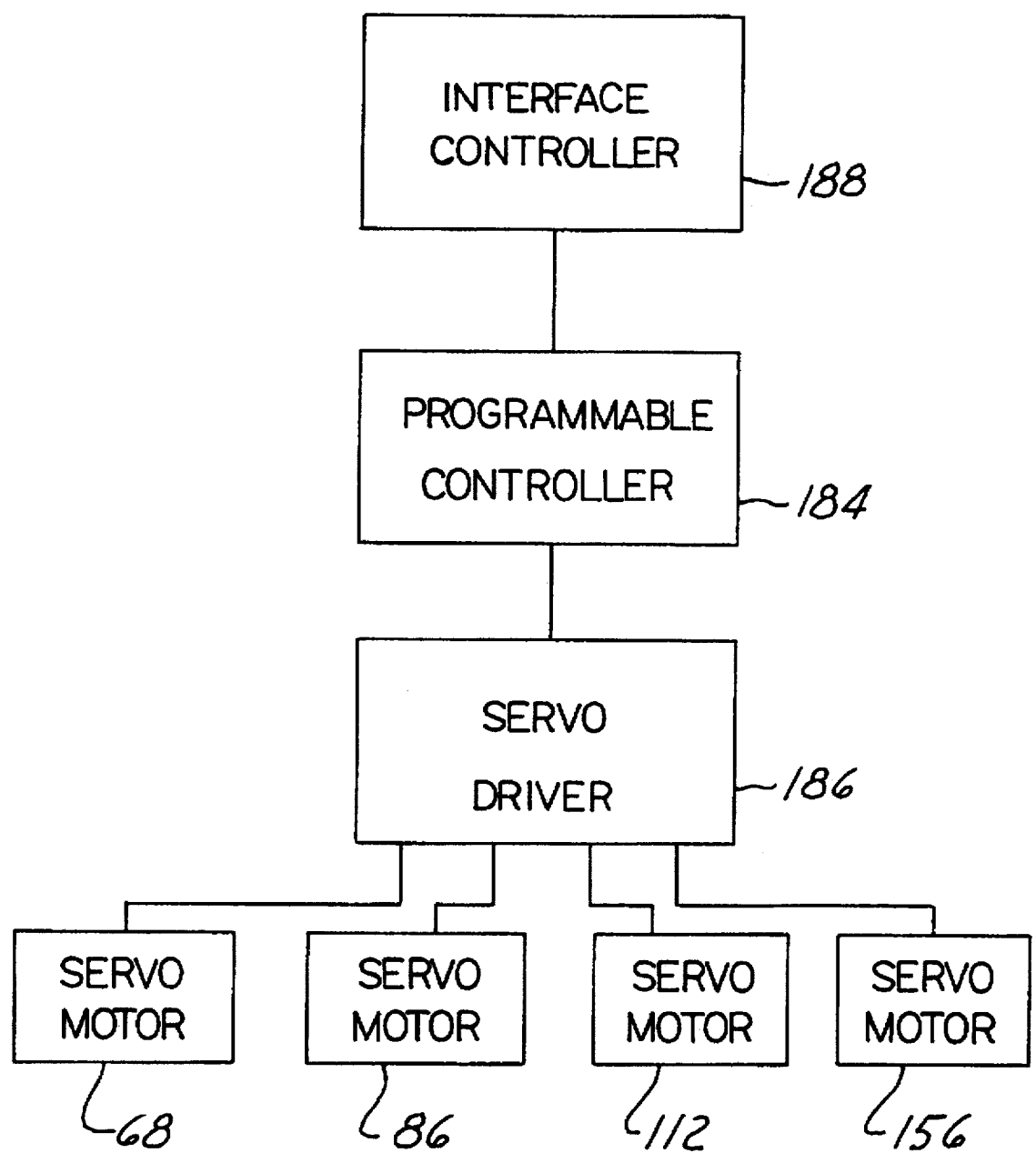
FIG. 11 is a schematic diagram of a control system for the invention.

Alternatively, as shown in FIGS. 9 and 10, a second type of engaging member, a rigid butt form 176, is attached to loading shaft 164 by a second type of engagement bracket 177 having trunnion style pivot 178 disposed between it and loading shaft 164. A cylinder of an actuator 180 is pivotably mounted to a loading bracket 182 in turn fixed to loading shaft 164. Rigid butt form 176 pivots with displacement of actuator 180 and rotates with shaft 164. The use of rigid butt form 176 allows the use of just the single actuator 180, making the test easier to set up and run.

The inventive seat test machine 20 is operated as follows. Before testing is initiated, the seat loading conditions must be established. The loading conditions are essentially a function of how people would seat themselves in a vehicle. This will differ significantly with the type of vehicle. For example, with a sports car which sits very low to the ground, people have a tendency to grab the steering wheel, place one foot inside the vehicle, and then drop themselves onto the seat. Their exit would differ in that they would twist toward the door before stepping out.

In contrast, a person entering a heavy duty truck cab would pull themselves up into the cab and then lower or drop themselves onto the seat. However, on exit, the person would swing their legs out toward the door, and then slide across and off the seat to exit the cab.

Once the appropriate loading conditions have been established, a controller program is developed to closely replicate the loading and relative butt-to-seat motions to be included in the test. An exemplary sequence of operations is as follows:

1. Position engaging member over 40 over seat 28, to the left of the seat center.

2. Drop engaging member 40 onto seat 28 from a predetermined height.
3. Slide engaging member 40 rightward to a center of seat 28.
4. Rotate engaging member 40 90° toward an imaginary door while sliding engaging member 40 laterally leftward across seat 28.
5. Displace left leg upward, simulating the planting of the passenger's foot on the ground outside the door. Lift engaging member 40 away from seat 28 to complete an entry/exit cycle.

The seat test machine 20 is controlled by a programmable controller 184. A servo driver 186 is disposed between and electrically connects the programmable controller 184 and the servos 68, 86, 112, 156. The test operator programs the controller through an interface controller 188 having a plurality of function buttons with identifying labels on the face of the interface controller. Each of servo motors 68, 86, 112, 156 include an integral rotation detection means providing a signal comprising a pre-determined number of pulses per revolution of the motor shaft. These control devices 184, 186, 188 are not discussed in greater detail, because they are well-established in the prior art of servo-controlled test equipment. By monitoring and storing pulse signals generated by the servo motors, the programmable controller 184 is able to monitor the exact fore-aft position of seat mount 26, vertical carriage 29, lateral carriage 30 and the relative rotative position of loading shaft 164 produced by twist actuator 46.

Once the sequence of operations has been established, the seat 28 which is to be tested is fixed to seat mount 26, and the controller programmed. Servo motors 68, 86, 112 and 156 are driven by the controller with the operator using the interface controller to position engaging member 40 over seat 28 in the desired position from which engaging member 40 will drop onto seat 28 for step 1. The position of each of the servo motors is stored by the programmable controller responsive to a command by the operator. Loading carriage 32 is locked to lateral carriage 30 by actuator 138 and pin 140. The position of vertical carriage 29 established by vertical drive motor 86 must be sufficiently low so that loading carriage 32 has adequate vertical travel to accommodate the full deflection of seat 28 when it is subjected to drop loading.

Engaging member 40 is then centered with respect to seat 28 where an occupant would position themselves. This is done with releasing pin 140 disengaged from engaging plate 142, so as to be certain of the relative positions of the engaging member 40 and seat 28. The positions of the servo motors are again stored by the controller, responsive to a command by the operator. Next, twist actuator 154 is used to rotate dummy 40 90° while sliding dummy 40 across the seat laterally to a pre-determined position. The positions of servo motors 68, 86, 112 and 156 are again stored. A command is entered by the operator to indicate that actuator 44 should be displaced downward. A command is also entered for the subsequent lifting of engaging member 40 from seat 28. This may be accomplished by using vertical servo motor 86 to lower vertical carriage 29, and lateral carriage 30 therewith until pin 140 can again be received by receiving aperture 144 of engaging plate 142 and then using pneumatic actuator 138 to displace locking pin 140 into receiving aperture 144. These positions are then stored. This completes the programming of the test.

Once the programming has been completed, the operator can initiate continuous cycling of seat test machine 20. Using the above example, with loading carriage 32 already locked to lateral carriage 30 by pin 140, engaging member 40 is positioned over seat 28 by the controller using the stored servo positions. Loading carriage 32 is released by withdrawing pin 140 from aperture 144, with dummy 40 resultantly impacting seat 28, simulating a person dropping into the seat. Lateral servo motor 112 drives lead screw 106 to displace lateral carriage 30, thereby centering dummy 40 with respect to seat 28. Twist servo motor 156 then rotates loading shaft 164 90° and lateral servo motor 112 moves lateral carriage and dummy 40 leftward. To simulate the movement of person exiting the vehicle, pneumatic actuator 44 is actuated, displacing the rights leg portion downward against seat 28 by the controller energizing an airflow valve directing air to the actuator. Vertical servo motor 86 lowers vertical carriage 29 until pin 140 can engage aperture 144. After engagement, vertical servo motor 86 lifts dummy 40 from the seat, restoring it to a start-of-cycle position above seat 28.

While, for the sake of simplicity of the example, no mention has been made of the use of the fore-aft servo motor 68, it would be used to provide relative fore-aft position changes between seat 28 and engaging member 40 to simulate such movement when needed to duplicate entry and/or exit from a vehicle. For example, if observations indicated that people initially sat on a forward edge of the seat and then slid backward, the fore-aft servo motor 68 would be used to reproduce that motion.

Attention so far has been directed to varying the position of engaging member 40 with respect to seat 28. However, seat test machine 20 also enables one to vary the load in the vertical direction applied against seat 28. The load sustained by seat 28 is substantially a function of the mass of loading carriage 32 and everything fixed thereto, including twist actuator 154 and engaging member 40. Loading carriage 32 moves freely on vertical loading rails 122, with its travel being limited, within the earlier discussed available range of travel, by seat 28. To increase the force against seat 28, ballast plates 153 are placed on top of plate 152 of loading carriage 32. To reduce the force of the dummy 40 or rigid butt form 176 against seat 28 induced by the mass of loading carriage 32, torsion spring 126 is pre-loaded by rotatively displacing the left and right hand ends of spring 126 a pre-determined amount corresponding to the desired reduction in load. The amount of the established negative pre-load against loading carriage 32 by cable 134 is held constant by the cam increasing radius as spring 126 is wound more tightly when loading carriage 32 descends relative to lateral carriage 30. The cam profile, since it is a function of the torsional spring rate of torsion spring 126, enables a constant vertical load to be maintained throughout the range of vertical travel of loading carriage 32 and engaging member 40.

A pre-determined static load for engaging member 40 is established by placing loading carriage 32 in an uppermost position, so that cable 134 is coming off cam pulley 132 at the smallest radius. Loading carriage 32 is locked to lateral carriage 30 by pin 140. The pre-load is established by rotating the right hand side of the spring and a predetermined amount and locking it in place with a pin passing through one of a plurality of holes in lock wheel 130 thereby developing the desired pre-load in the cable. As is readily apparent, the described seat test machine 20 is highly effective in providing a durability test for motor vehicle seats which highly correlates to the actual wear of seats in the field, enabling one using this test machine to develop a superior seat of any given type.

Preferred embodiments have been disclosed. A worker of ordinary skill in the art would realize, however, that certain modifications would come within the teaching of this invention. For example, the specific configurations of the frame members and carriages may be varied, as long as they remain structurally adequate. The following claims should be studied in order to determine the true scope and content of the invention.

We claim:

1. A multi-axis seat test machine for use in durability testing of seats, comprising:

a loading element;

a substantially planar seat mount;

a selectively actuable fore-aft testing displacement mechanism disposed between the loading element and the seat mount and operatively displacing one of the seat mounting and the loading element relative to the other in a fore-aft direction;

a selectively actuable lateral testing displacement mechanism disposed between the loading element and the seat mount and operably displacing one of the seat mount and the loading unit relative to the other in a lateral direction; and an engaging member simulating at least in part a shape of a human posterior for engagement with the seat, wherein the loading element operably biases the engaging member against the seat in a substantially vertical direction with a predetermined vertical load.

2. A multi-axis seat test machine as claimed in claim 1 wherein:

an actuator is disposed between the loading element and the engaging member and operably pivots the engaging member about an axis simulating rotation of at least one leg relative to an associated hip.

3. A multi-axis seat test machine as claimed in claim 1 wherein a selectively actuable displacement mechanism is disposed between the loading element and the engaging member, operably rotating engaging member to simulate a twisting motion of the posterior against the seat.

4. A multi-axis seat test machine as claimed in claim 3 wherein the loading element is a structure slidably mounted for movement in a vertical direction relative to the seat and ballasted to a pre-determined vertical force load.

5. A multi-axis seat test machine for use with seats, comprising:

a programmable controller;

test fixture frame;

a loading element mounted to the test fixture frame;

a seat mount slidably mounted to the test fixture frame;

seat fixed to the test fixture frame;

selectively actuable fore-aft testing displacement mechanism electrically connected to the programmable controller and disposed between the loading element and the seat mount and operably displacing one of the seat mount and the loading element relative to the other in the fore-aft direction responsive to the controller;

a selectively actuable lateral testing displacement mechanism electrically connected to the programmable controller and disposed between the loading element and the seat mount and operably displacing one of the seat mount and the loading element relative to the other in a lateral direction responsive to the controller; and an engaging member simulating at least in part a shape of a human posterior for engagement with the seat fixed to the loading element, wherein the loading element operably biases the engaging member against the seat in a substantially vertical direction with a pre-determined vertical load.

6. A multi-axis seat test machine as claimed in claim 5 wherein:

an actuator is disposed between the loading element and the engaging member and operably pivots the engaging member about an axis simulating rotation of at least one leg relative to an associated hip.

7. A multi-axis seat test machine as claimed in claim 5 wherein a selectively actuable displacement mechanism is disposed between the loading element and the engaging member, operably rotating engaging member to simulate a twisting motion of the posterior against the seat.

8. A multi-axis seat test machine as claimed in claim 5 wherein the loading element is a structure slidably mounted for movement in a vertical direction relative to the seat and ballasted to a pre-determined vertical force load.

9. A multi-axis seat test machine for durability testing of seats comprising:

a test fixture frame;

a loading element slidably disposed for movement relative to the test fixture. frame in a vertical direction;

a spring with a first end fixed to the frame and having a known spring rate;

a cam rotatively mounted on the frame and fixed to a second end of the spring and having a cam profile which is a function of the spring rate; and a cable wrapped over the cam with a first end of the cable fixed to the cam and a second end of the cable fixed to the loading element, wherein as the loading element is moved in a vertical direction, the spring deflects and the cam rotates thereby changing a cam radius acting against the spring to maintain a constant cable force against the loading element.

10. A multi-axis seat test machine as claimed in claim 1 further comprising a programmable controller wherein the fore-aft and lateral displacement mechanisms are electrically connected to the programmable controller and the fore-aft and lateral displacement mechanisms are responsive to the controller.

* * * * *

UNITED STATES PATENT AND TRADEMARK OFFICE
CERTIFICATE OF CORRECTION

PATENT NO.  : 5,641,917
DATED       : June 24, 1997
INVENTOR(S) : Hurite

It is certified that error appears in the above-indentified patent and that said Letters Patent is hereby corrected as shown below:

In column 7, line 47, insert --a-- before "test".

In column 7, line 50, insert --a-- before "seat".

Signed and Sealed this

Ninth Day of September, 1997

Attest:

BRUCE LEHMAN

Attesting Officer

Commissioner of Patents and Trademarks